B. H. CROSS.
HARNESS.
No. 172,978. Patented Feb. 1, 1876.
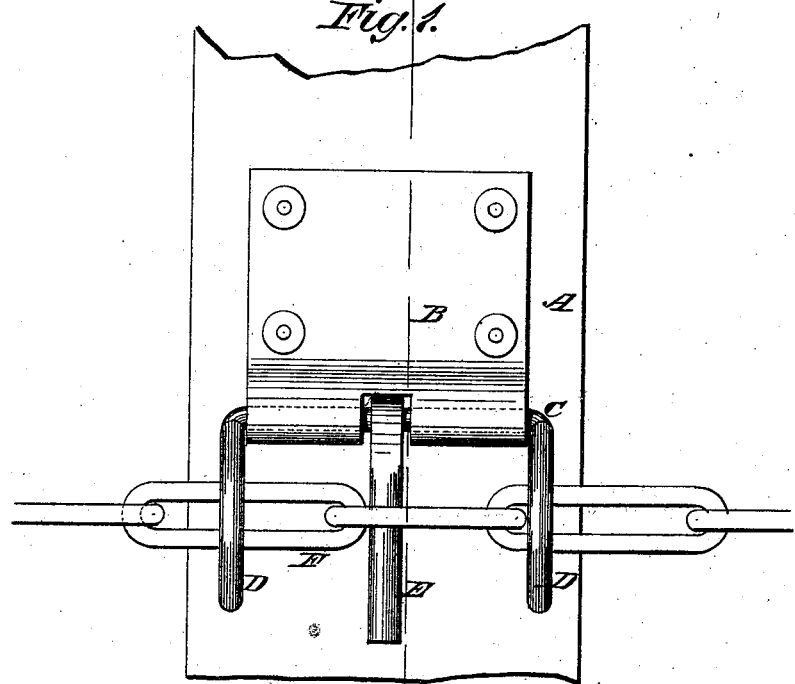
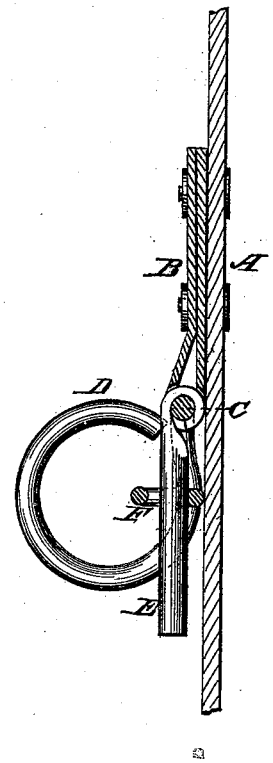
WITNESSES:
Francis McArdle
John Goethals
INVENTOR:
B. H. Cross
BY
ATTORNEYS.

UNITED STATES PATENT OFFICE.

BENJAMIN H. CROSS, OF BYRON, GEORGIA.

IMPROVEMENT IN HARNESS.

Specification forming part of Letters Patent No. 172,978, dated February 1, 1876; application filed January 3, 1876.

*To all whom it may concern:*

Be it known that I, BENJAMIN H. CROSS, of Byron, Houston county, Georgia, have invented a new and Improved Back-Strap and Trace-Connection, of which the following is a specification:

My invention consists of a couple of rings and a buckle-tongue suspended from a bar fastened in a loop attached to the back-strap, so that the trace-chain passes through the rings and is fastened by the tongue, for connecting the trace-chain and back-strap together by a simple and cheap contrivance.

Figure 1 is a side elevation of my improved back-strap and trace-chain connection, and Fig. 2 is a section taken on the line $x\,x$.

Similar letters of reference indicate corresponding parts.

A is the back-strap; B, the loop; D, the rings; C, the wire fastened in the loop; E, the buckle-tongue, and F the trace-chain, the latter passing through the rings, and the tongues passing through the chain, thus making a simple and cheap contrivance for buckling the chain and the back-band together. The rings may be complete, or they may be open at the top to some extent. The rings support the chain and prevent it from dropping down when detached from the buckle-tongue.

Having thus described my invention, I claim as new and desire to secure by Letters Patent—

A device for supporting trace-chains, consisting of the rings D D, united by a bar, and having the buckle-tongue E pivoted thereto, and adapted for use with the back-strap A, substantially as specified.

BENJAMIN H. CROSS.

Witnesses:
 THOS. B. GOFF,
 JOS. P. GURR,
 W. W. WAGNON.